US008832803B1

(12) United States Patent
Smith et al.

(10) Patent No.: US 8,832,803 B1
(45) Date of Patent: *Sep. 9, 2014

(54) SYSTEMS AND METHODS FOR INCREASED SECURITY DURING LOGGING IN TO WEB SITE

(71) Applicant: United Services Automobile Association (USAA), San Antonio, TX (US)

(72) Inventors: Arthur Q. Smith, Fredericksburg, TX (US); Ronnie A. Eichler, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/746,700

(22) Filed: Jan. 22, 2013

Related U.S. Application Data

(63) Continuation of application No. 13/310,363, filed on Dec. 2, 2011, now Pat. No. 8,359,639, which is a continuation of application No. 12/164,889, filed on Jun. 30, 2008, now Pat. No. 8,074,263.

(51) Int. Cl.
*G06F 7/04* (2006.01)
*G06F 21/60* (2013.01)

(52) U.S. Cl.
CPC ................................. *G06F 21/60* (2013.01)
USPC .............................................................. 726/4

(58) Field of Classification Search
USPC ......... 713/151, 152, 165, 172, 164, 169, 193; 726/4, 5, 8, 9, 17, 18, 23, 24, 27, 28, 726/29
See application file for complete search history.

(56) References Cited

U.S. PATENT DOCUMENTS

| 7,331,062 | B2 | 2/2008 | Alagna et al. |
| 8,065,695 | B1 | 11/2011 | Smith et al. |
| 8,074,263 | B1 | 12/2011 | Smith et al. |

(Continued)

FOREIGN PATENT DOCUMENTS

WO 97/50063 A2 12/1997

OTHER PUBLICATIONS

King, S.T. et al., "SubVirt: Implementing malware with virtual machines", IEEE Xplore2.0, This paper appears in: Security and Privacy, 2006 IEEE Symposium on Publication Date: May 21-24, 2006. Retrieved from the internet: <http://ieeexplore.ieee.org/xpl/freeabs_all.jsp?tp=&arnumber=1624022&isnumber=34091>. 1 pg.

*Primary Examiner* — Beemnet Dada
(74) *Attorney, Agent, or Firm* — Fish & Richardson P.C.

(57) ABSTRACT

A user at a computing device interacts with a networked site so that the user can log in thereto. The site receives a selection to log in and in response downloads at least one replacing driver for bypassing a corresponding driver operating on the computing device that may possibly copy log-in data including authentication credentials as entered by the user. Each replacing driver is loaded into an operating system of the computing device so as to bypass the corresponding possibly copying driver and be employed in the operating system rather than such corresponding bypassed driver. The site then delivers a log-in screen to a presentation application of the computing device after each replacing driver has been loaded. The presentation application displays the log-in screen and the user enters the log-in data thereinto. Accordingly, each non-trusted and bypassed driver is unable to copy the entered log-in data.

20 Claims, 4 Drawing Sheets

(56) References Cited

U.S. PATENT DOCUMENTS

| 8,359,639 | B1 | 1/2013 | Smith et al. |
| 2002/0077978 | A1 | 6/2002 | O'leary et al. |
| 2004/0187023 | A1 | 9/2004 | Alagna et al. |
| 2006/0184651 | A1 | 8/2006 | Tirnumala |
| 2007/0199058 | A1 | 8/2007 | Baumgart et al. |
| 2007/0300057 | A1 | 12/2007 | Corcoran et al. |
| 2008/0301674 | A1 | 12/2008 | Faus |
| 2009/0044266 | A1 | 2/2009 | Sharp et al. |
| 2009/0125989 | A1 | 5/2009 | Flaherty et al. |
| 2010/0058064 | A1 | 3/2010 | Kirovski et al. |

SYSTEMS AND METHODS FOR INCREASED SECURITY DURING LOGGING IN TO WEB SITE

CROSS-REFERENCE TO RELATED APPLICATIONS

This application is a continuation of U.S. patent application Ser. No. 13/310,363, filed Dec. 2, 2011, now U.S. Pat. No. 8,359,639, which is a continuation of U.S. patent application Ser. No. 12/164,889, filed on Jun. 30, 2008, now U.S. Pat. No. 8,074,263. This application is also related in subject matter to, and incorporates herein by reference in its entirety, each of the following: U.S. patent application Ser. No. 12/254,562, filed on Oct. 20, 2008; and U.S. patent application Ser. No. 12/254,569, filed on Oct. 20, 2008.

FIELD

The present disclosure is directed to systems and methods that provided a user with increased security when logging in to a web site. More particularly, the present disclosure is directed to such systems and methods that provide such increased security by instantiating a virtual machine on a computing device of the user during such logging in to the web site.

BACKGROUND

A user employing a computing device and a network connection to interact with a networked site is subject to multiple avenues of attack by nefarious entities. For example, a user at a web site on the Internet may be exposed to such a nefarious entity attempting to gain access and take control of the computer by way of the network connection. Similarly, the user must be careful that the web site does not download objectionable code to the computer, and also must be careful that the web site is indeed the web site that the user wishes to interact with.

Particularly when the interaction is of a sensitive nature, both the user and the site should take care to ensure that a nefarious entity cannot interfere with the interaction, and cannot obtain data during the interaction that could be employed by such nefarious entity in a harmful manner. For example, in the case of a financial transaction with a site or the like of a bank or the like, the user and the bank should ensure that a nefarious entity cannot interfere with any financial transactions the user is entering into with the bank by way of the site. Most notably, perhaps, both the user and the bank should ensure that sensitive data entered by the user during the transaction and the overall interaction is not stolen by such a nefarious entity and used thereby to the detriment of the user and the bank.

Typically, the most sensitive data that the user enters during such a transaction is the data that allows the user to log in to the site. After all, once logged in, the user and any nefarious entity that has stolen such log-in data can perform transactions at the site. For example, such a nefarious entity if accessing the site of a bank by way of such log-in data of the user can perform banking transactions in the name of the user that would be extremely harmful, including emptying deposit accounts of the user, initiating loans in the name of the user, etc.

Of course, the user may also interact with another site other than a bank site or the like where the interaction is of a particularly sensitive nature. For example, the user may interact with a retail and/or services site where the user has an account, such as a department store, an auto parts store, a music store, an auction site, etc. Regardless of the nature of site, though, both the user and the operator of the site should again ensure that sensitive data entered by the user during the overall interaction at such site is not stolen by such a nefarious entity and used thereby to the detriment of the user and the operator. Here, if the nefarious entity steals the data that allows the user to log in to the site, such nefarious entity can for example perform transactions at the site to obtain goods and service in the name of the user, and can even charge such goods and services to the user if the site already maintains appropriate charging information for such user.

As may be appreciated, the aforementioned log-in data that allows a user to log in to a site typically includes data that the user and the operator of the site have previously agreed upon, and may include authentication credentials such as a user name or the like, a password or the like, and perhaps other appropriated security-related information. Typically, the users enters such log-in data at the computing device thereof and into a web page instantiated on a browser or other presentation application of such computing device. To increase security, such web page is a secure web page delivered between the site and the browser of the computing device by way of a secure connection established according to a secure protocol, such as for example an 'HTTPS' (Hyper-Text Transfer Protocol over Secure Socket Layer) connection and protocol.

As may be appreciated, a secure connection such as the HTTPS connection encrypts communications between the site and the browser of the computing device, and as a result interception of such communications by a nefarious entity or the like is of little use inasmuch as the nefarious entity likely cannot decrypt same without difficulty. However, even if the nefarious entity cannot intercept and decrypt such communications, such nefarious entity can still attempt to steal such log-in data by other mechanisms. For example, one popular mechanism for stealing such log-in data is to copy such log-in data as the user enters same at the computing device.

In particular, at such computing device, such a nefarious entity may copy such log-in data including authentication credentials as entered by the user at the keyboard of the computing device by way of a keystroke logger that records each keystroke entered at the keyboard, by way of a video logger that records video changes that appear on a video display of the computing device, by way of a mouse logger that records mouse movements and commands entered by the user into a mouse or other pointing device of the computing device, etc. Typically, a nefarious entity would surreptitiously cause one or more of such loggers to be downloaded as software to the computing device, perhaps when the user visits a dubious web site, and such a downloaded logger would be quietly inserted into the operating system of the computing device in any of several known manners to be resident on the computing device.

As resident on the computing device, and as is known, such a logger would then quietly record data as entered by the user into the computing device, be it keystrokes, mouse movements, mouse commands, video changes, etc., and would forward the recorded data to the nefarious entity by way of the aforementioned network connection associated with the computing device. Thus, the nefarious entity can scan the recorded data for the aforementioned log-in data and upon finding same can employ the log-in data to improperly perform transactions at a corresponding network site, again without the permission of the user and to the detriment of such user and the operator of the site.

Accordingly, a need exists for a system and method that prevents a nefarious entity from stealing sensitive data from a computing device of a user, and particularly sensitive data employed by the user to gain access to a site on a network to which the computing device is communicatively coupled. More particularly, a need exists for such a system and method whereby the operator of the site downloads software to the computing device when the user logs in to the site to prevent the nefarious entity from stealing log-in data of the user for the site.

SUMMARY

The aforementioned needs are satisfied at least in part by a system and method that are employed with regard to a user at a computing device interacting with a networked site so that the user can log in to the site. The site receives from the user at the computing device a selection to log in to the site and in response thereto may send a surveyor application to the computing device. The surveyor application at the computing device surveys the operating system of the computing device, and the site receives from the surveyor application based on the survey thereby of the operating system data regarding each of several drivers in the operating system. The site determines from the data whether each of the several drivers can be trusted, and constructs a virtual machine (VM) customized to include a replacing driver corresponding to each non-trusted driver.

The site delivers the VM to the computing device of the user, and the computing device instantiates the delivered VM in the operating system and in the operational memory of the computing device so as to bypass each non-trusted driver with a corresponding replacing driver to be employed in the operating system rather than such corresponding bypassed driver. The site then delivers a log-in screen to a browser of the computing device after each replacing driver has been loaded into the operating system of the computing device in the operational memory thereof. The browser displays the log-in screen to the user and the user enters the log-in data into the displayed log-in screen. Accordingly, each non-trusted and bypassed driver is unable to copy the entered log-in data.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
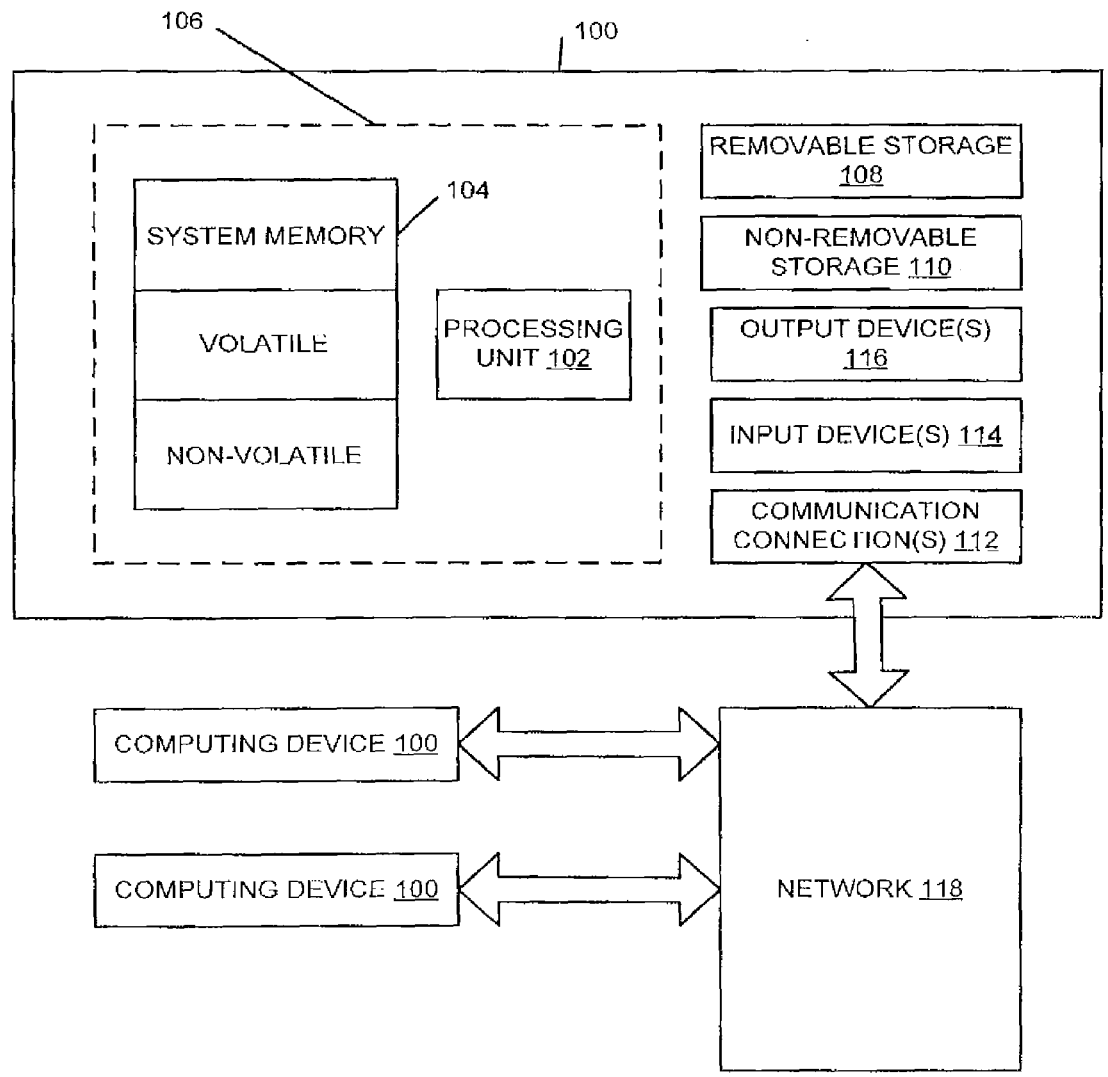
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Logging in to Site Via Virtual Machine

Figure 2:
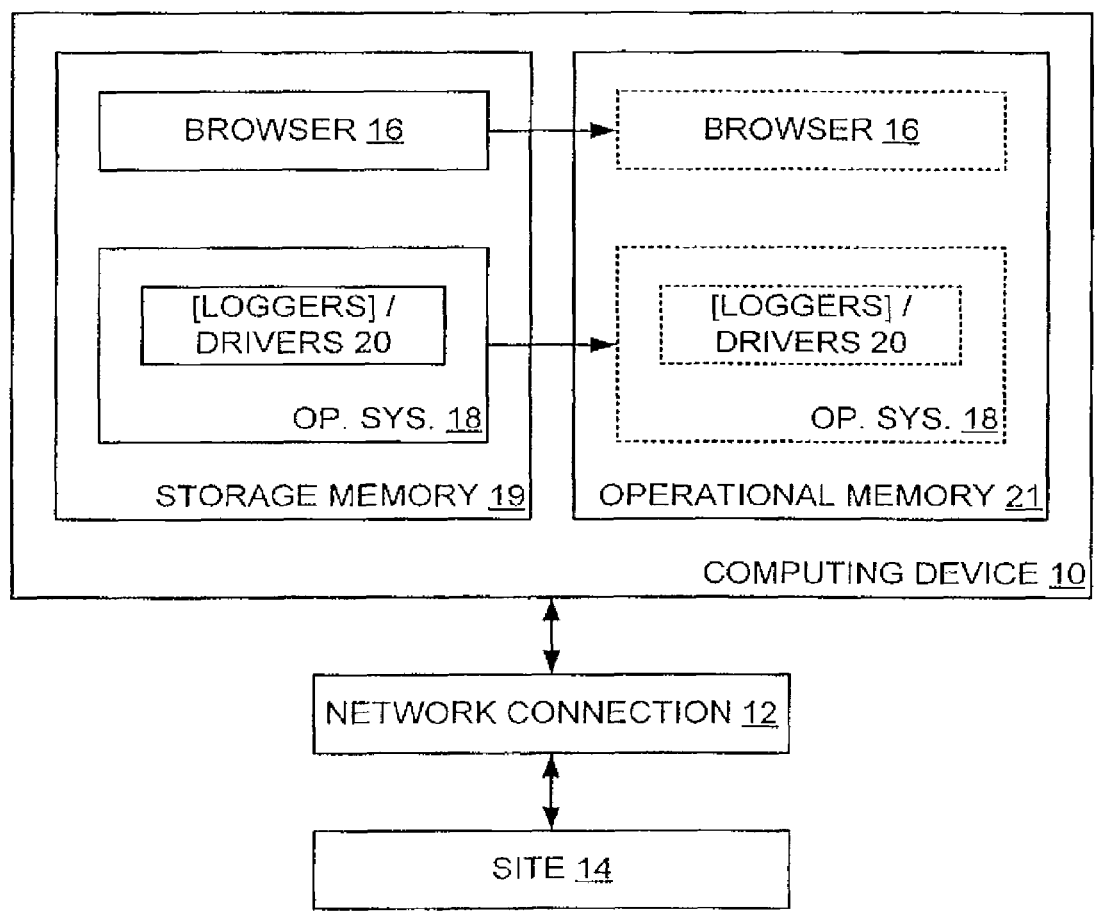
FIG. 2 is a block diagram of a system including a computing device communicatively coupled to a network site, where the system prevents a nefarious entity from stealing sensitive data employed by the user at the computing device to gain access to the site in accordance with various embodiments of the present innovation.

Turning now to FIG. 2, it is seen that a user employs a computing device 10 with a network connection 12 to interact with a networked site 14. As may be appreciated, the user, device 10, connection 12, and site 14 may be most any user, device, connection, and site without departing from the spirit and scope of the present innovation. For example, the user may be an individual interacting with a banking site on the Internet by way of a personal computer, or may be an agent of an organization interacting with a retail purchasing site on a private network by way of a mobile handheld device, among many other scenarios. Note that the site 14 may be interpreted to include a single site, a collection of sites that are generally accessed collectively, sites related to a site and accessed from the site, and the like.

Particularly when the interaction is of a sensitive nature, and as was set forth above, both the user and the site 14 should take care to ensure that a nefarious entity cannot interfere with the interaction, and cannot obtain data during the interaction that could be employed by such nefarious entity in a harmful manner. Thus, the user should not download questionable programs that could wreak havoc on the computing device 10, for example, and the operator of the site 14 should perform such interaction with the user in a secure manner, especially when sensitive information is exchanged between the user and the site 14.

While much information that is exchanged between the user and the site 14 may be considered sensitive, it is likely the case that the most sensitive data that the user enters during such a transaction is the data that allows the user to log in to the site 14. As was pointed out above, if such log-in data is stolen when entered or at any other time by a nefarious entity, such nefarious entity that has stolen such log-in data can perform transactions at the site 16. Thus, if a banking site 14 of a bank, the nefarious entity can at least potentially empty deposit accounts associated with the user at the bank; if a retailer site 14 of a retailer, the nefarious entity can at least potentially order goods or services from the retailer in the name of the user and possibly charged to the user; if a high security site 14 of an organization, the nefarious entity can at least potentially steal secrets of the organization under the guise of being the user; and the like.

As was pointed out above, the aforementioned log-in data that allows a user to log in to the site 14 typically includes data that the user and the operator of the site 14 have previously agreed upon, and may include a user name or the like, a password or the like, and perhaps other appropriated security-related information including a security picture, one or more security questions, etc. Typically, to log in to the site 14, the site 14 provides a log-in interface page to a presentation application such as a browser 16 on the computing device 10 of the user, the users enters the log-in data thereof in such log-in interface page on the browser 16 of the computing device 10, and the log-in data is then transmitted from the browser 16 to the site 14 for verification thereat. Significantly, to combat theft of such log-in data, the log-in interface page is a secure web page delivered between the site 14 and the browser 16 of the computing device 10 by way of a secure connection established according to a secure protocol, such as for example the aforementioned 'HTTPS' (Hyper-Text Transfer Protocol over Secure Socket Layer) connection and protocol.

Note, though, that while the HTTPS connection protects the log-in data from theft while in transit between the browser 16 and the site 14, such HTTPS connection does not protect such log-in data while being entered into the computing device 10 by the user, or while being displayed on a display associated with such computing device 10, among other things. Put generally, the log-in data is still vulnerable to theft from areas of the computing device associated with input and output, including but not limited to keyboard entry, mouse entry, other human interface device entry, data display, and the like.

Put more specifically, a nefarious entity may copy such log-in data including authentication credentials as entered by the user or displayed to the user by way of a software logger 20 that records data as entered or displayed in connection with the computing device 10. For example, and as was set forth above, it is known that such a nefarious entity may employ a keyboard logger 20 that records each keystroke entered at the keyboard, a video logger 20 that records video changes that appear on a video display of the computing device, a mouse logger 20 that records mouse movements and commands entered by the user into a mouse or other pointing device of the computing device, etc.

As was noted above, such a software logger 20 is typically downloaded or otherwise placed on the computing device 10 by the nefarious entity in any of a number of scenarios. For example, the user may unwittingly download such a logger 20 when the user visits a dubious web site, during which the downloaded logger 20 is quietly inserted into a software operating system 18 of the computing device 10 as stored in a storage memory 19 thereof, such as a hard drive, for example. For another example, the nefarious entity may as a matter of espionage or opportunism purposefully store the logger 20 in such storage memory 19, perhaps in person at a public computing device 10 employed by the user at a library, a coffeehouse, etc., or at a private computing device 10 of the user, perhaps at the home or office of the user.

As should be understood, the logger 20 is typically in the form of a driver or the like employed by the operating system 18 of the computing device 10. For example, if the logger 20 is a keyboard logger, such keyboard logger 20 may be embedded within a substitute keyboard driver for another keyboard driver in the operating system 18. Alternately, the keyboard logger might be in the form of a separate keyboard driver associated with such a substitute keyboard driver, where the separate keyboard driver and the substitute keyboard driver work in conjunction with one another to perform logging.

Accordingly, the logger 20/driver is loaded from the storage memory 19 of the computing device 10 into an operational memory 21, such as random access memory (RAM), as is shown in FIG. 2, each time the operating system 18 is loaded into the operational memory 21 on the computing device 10. As loaded, the logger 201 driver quietly operates to record whatever data the logger 20 is intended to monitor, be it keystrokes entered by the user at a keyboard of the computing device 10, mouse movements at a mouse, video changes on a display, etc., and in a manner that is generally known or should be apparent to the relevant public and therefore need not be set forth herein in any detail. As recorded, such data, which may include the aforementioned log-in data, is at some point forwarded to the nefarious entity by way of the network connection 12 associated with the computing device 10. Thus, the nefarious entity can scan the recorded data for the log-in data and upon finding same can employ the log-in data to improperly perform transactions at the corresponding site 14, without the permission of the user and to the detriment of such user and the operator of the site 14.

Figure 3:
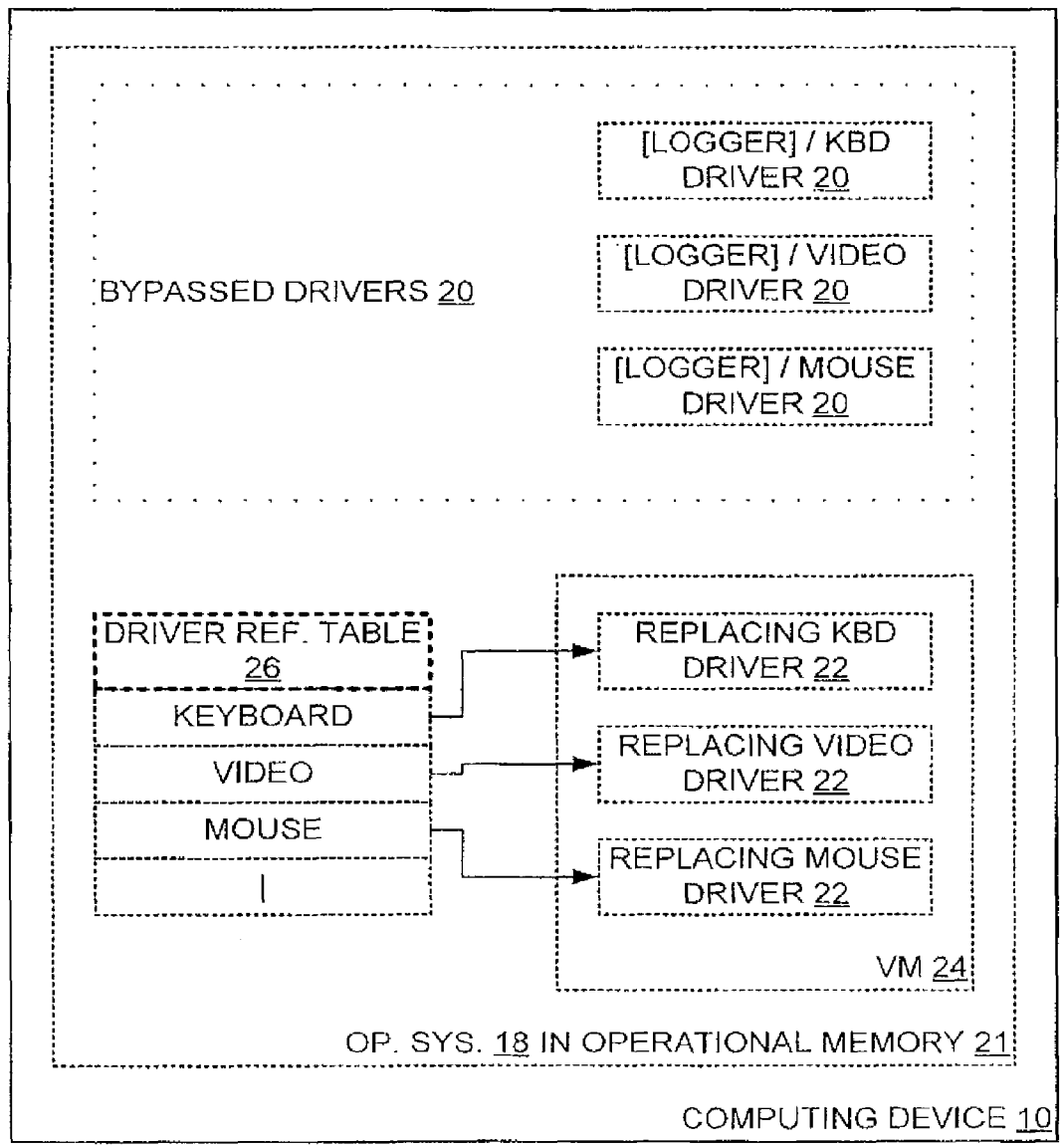
FIG. 3 is a block diagram of a portion of the computing device of FIG. 2 in accordance with various embodiments of the present innovation.

In various embodiments of the present innovation, then, and to combat the presence of any driver that may be such a logger 20 (hereinafter, 'logger driver 22'), and turning now to FIG. 3, the site 14 as part of the log-in process downloads software to the computing device 10 of the user, where the downloaded software includes select input/output drivers 22 to bypass possible logger drivers 20 that may be operating on the computing device 10. Note, though, that each such replacing driver 22 is to be loaded directly into the operating system 18 of the computing device 10 as loaded in the operational memory 21 thereof, and not in the storage memory 19 (FIG. 2) of such computing device 10. Note, too, that once the log-in process is finished, the operating system 18 as loaded in the operational memory 21 should be returned to its previous state as it existed just prior to the log-in process, at least as a matter of good form. Accordingly, and in various embodiments of the present innovation, the downloaded software from the site 14 is in the form of a virtual machine (VM) 24 or the like that is instantiated in the operational memory 21 of the computing device 10.

As should be understood, a virtual machine (VM) 24 may be considered to be a software implementation of a computer or a portion thereof or the like that executes programs like a real machine. Such a VM 24 was originally defined as an efficient, isolated duplicate of a real machine, although a VM 24 may also have no direct correspondence to any real hardware. Thus, a VM 24 may include software that takes the place of a portion of the operating system 18 of a computing device 10, as is the case in the present innovation. A VM 24 may be a 'system' virtual machine that provides a complete system platform which supports the execution of a complete operating system (OS), or as is the case in the present innovation, the VM 24 may be a 'process' or 'application' virtual machine designed to support a single process or application.

More particularly with regard to the present innovation, the VM 24 as provided by the site 14 may include therein one or more of the replacing drivers 22, each of which is to be instantiated in the operating system 18 of the computing device 10 so as to be employed rather than a corresponding bypassed driver 20 that may have a logger associated therewith. As should be understood, the bypassed driver 20 is located by other entities within the operating system 18 by way of a reference thereto in a driver reference table 26 or the like, the actual bypassing takes place when the provided VM 24 is instantiated in the operating system 18, and such actual bypassing includes altering the reference to the bypassed driver 20 as set forth in the driver reference table 26 to instead refer to the corresponding replacing driver 22, as is shown in FIG. 3.

In doing so, and as should now be evident, any entity on the computing device 10 that wishes to locate the bypassed driver 20 that possibly has a logger associated therewith instead locates the corresponding replacing driver 22. As a result, the replacing driver 22 is employed within the operating system 10 rather than the bypassed driver 20. Such replacing driver 22 as supplied by the VM 24 and in turn by the site 14 is deemed by the site 14 to be more trustworthy than the corresponding bypassed driver 20, at least insofar as the replacing driver 22 should not support any logging activity as may be performed for a nefarious entity. Accordingly, the replacing driver 22 is trusted by the site 14 to prevent theft of log-in data from the user during the log-in process.

The VM 24 itself as supplied by the site 14 may be any appropriate VM without departing from the spirit and scope of the present innovation. For example, the VM 24 may include one or more replacing drivers 22 to substitute for corresponding bypassed drivers 20 already instantiated in the operating system 18 on the computing device 10, and may also include appropriate processing code for, prior to performance of the log-in process, instantiating each replacing driver 22 in the operating system 18 and altering the appropriate reference in the driver reference table 26 to 'point' to such instantiated replacing driver 22 rather than the corresponding bypassed driver 20. Additionally, the VM 24 may include further appropriate processing code for, after performance of the log-in process, removing each replacing driver 22 from the operating system 18 and altering the appropriate reference in the driver reference table 26 to again 'point' to the corresponding bypassed driver 20. Such processing code is known or should be apparent to the relevant public and therefore need not be set forth herein in any detail other than that which is provided.

Notably, the replacing drivers 22 included in any VM 24 as supplied by the site 14 may be a standard set of replacing drivers 22 or may be a set of replacing drivers customized to the operating system 18 of the computing device 10 to which the VM 24 is delivered. In the latter case, it may be that the site 14 prior to supplying the VM 24 sends a surveyor application or the like to the computing device 10, where such surveyor application in effect surveys the operating system 18 of the computing device and reports back to the site 14 data regarding each of several drivers 20 in the operating system 18 that perform input or output functions and that might require bypassing as being suspect.

The drivers 20 reported on by the surveyor application may be most any appropriate drivers without departing from the spirit and scope of the present innovation, presuming such drivers 20 are related to an input or output function and thus may be employed to record log-in data by a nefarious entity. For example, such drivers 20 may include the keyboard driver and related drivers, the mouse driver and related drivers, the video driver and related drivers, and the like. Notably, such drivers 20 may particularly include drivers 20 associated with the browser 16. The data reported back on each such driver 20 may be most any data, but presumably is data that identifies the driver 20, including who supplied same, a version number, whether the driver 20 has a valid digital certificate that verifies, whether the certificate is derived from a trusted root authority, and the like. Based on such identifying data, then, the site 14 can determine whether the driver 20 is to be trusted during the log-in process not to record the log-in data.

Presumably, then, the site 14 determines that each of one or more of the drivers 20 is not to be so trusted. Reasons for such a determination may be most any reasons, but likely include age of the driver 20, source of the driver 20, the lack of a verifying certificate, the lack of a trusted root authority, and the like. As should now be understood, each non-trusted driver 20 is to be bypassed, then, and accordingly the site 14 constructs the VM 24 to include a replacing driver 22 corresponding to each non-trusted driver 20.

Figure 4:
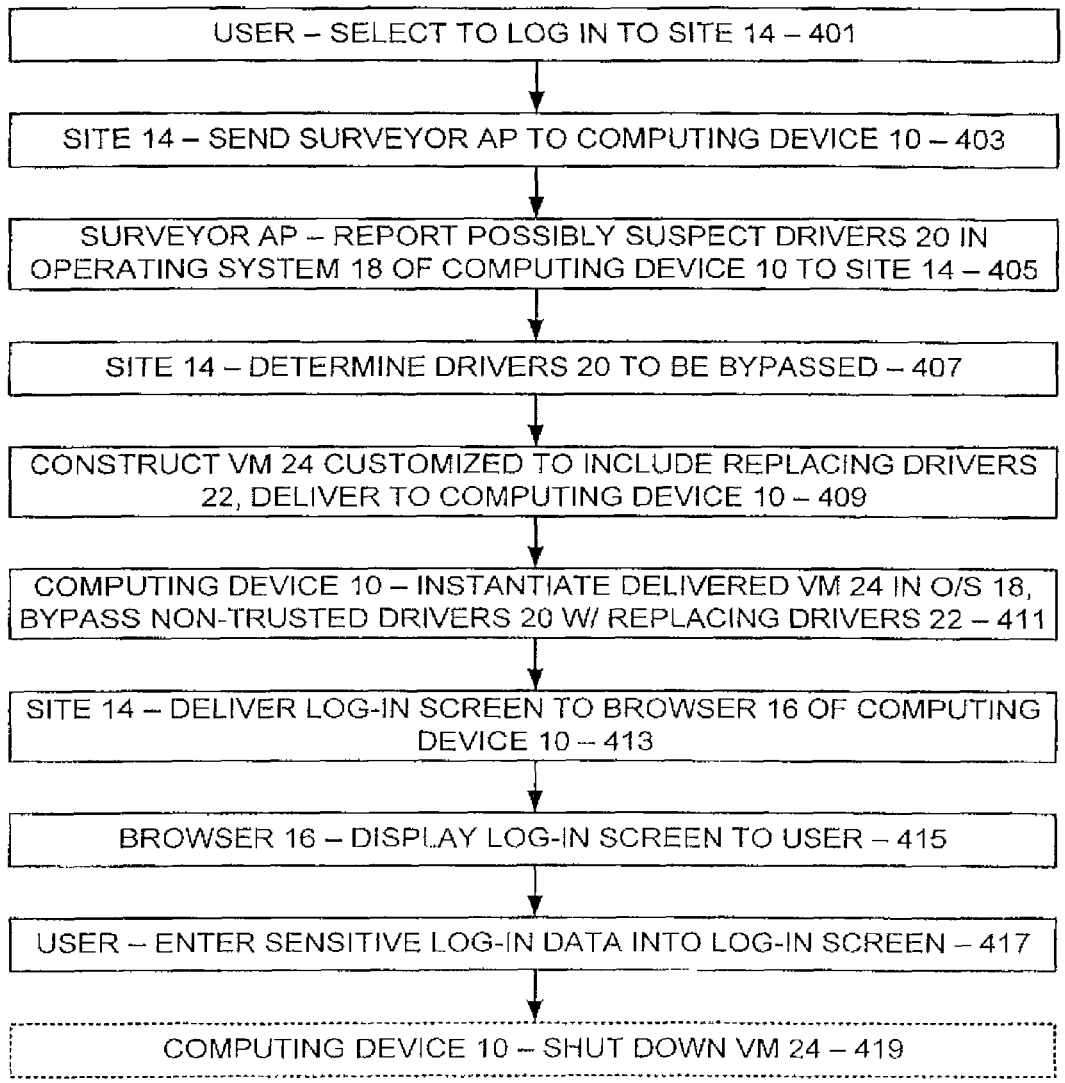
FIG. 4 is a flow diagram showing actions performed in connection with the system of FIG. 2 and the computing device of FIG. 3 in accordance with various embodiments of the present innovation.

To summarize, now, and turning to FIG. 4, a method to be employed in connection with the present innovation is shown. Preliminarily, a user at a computing device 10 employs a browser 16 instantiated thereon to navigate to a site 14 by way of a network connection 12, and selects to log in to the site 14 (401). In response, the site 14 does not immediately deliver a log-in screen or the like to the browser. Instead, the site 14 sends a surveyor application to the computing device 10 (403), and the surveyor application surveys the operating system 18 of the computing device 10 and reports back to the site 14 data regarding each of several possibly suspect drivers 20 in the operating system 18 (405), in a manner such as that which was set forth above.

Thereafter, the site 14 determines whether each of the possibly suspect drivers 20 can be trusted. Presuming that the site 14 in fact determines that each of one or more of the drivers 20 is not to be so trusted and should be bypassed (407), the site 14 then constructs a VM 24 customized to include a replacing driver 22 corresponding to each non-trusted driver 20 and delivers the customized VM 24 to the browser 16 of the computing device 10 (409). The browser 16 or another entity of the computing device then automatically instantiates the delivered VM 24 in the operating system 18 and in the operational memory 21 of the computing device 10 (411) so as to in fact bypass each non-trusted driver 20 with a corresponding replacing driver 22.

Notably, only after the VM 24 has been instantiated does the site 14 deliver the log-in screen to the browser 16 of the computing device 10 (413). In response, the browser 16 displays the log-in screen to the user (415) and the user commences the log-in process by entering the sensitive log-in data into the log-in screen (417). As should understood, such entry of such log-in data is especially protected inasmuch as the non-trusted drivers 20 have been bypassed by the replacing drivers 22 of the VM 24, and such non-trusted drivers 20 cannot be employed to record such log-in data and forward same to a nefarious entity. Presumably, the log-in process is successful, after which the VM 24 may be shut down (419). As a result, and as was set forth above, the replacing drivers 22 are removed and the bypassed drivers 20 are again available for use.

A question may arise as to why the non-trusted drivers 20 are not permanently replaced, rather than being only temporarily bypassed. One answer may be that the replacing drivers 22 provide enough functionality to allow the log-in process to proceed in a satisfactory and trustworthy manner, but not necessarily all of the functionality that the bypassed drivers 20 provide. Accordingly, the bypassed drivers 20 may be needed at some point for some functionality not available from the replacing drivers 22. Another answer may be that the resources required to operate the VM 24 are high, and such resources can be put to better use after the log-in process is completed. Nevertheless, it may be that the VM 24 can be left to operate indefinitely after the log-in process has completed without departing from the spirit and scope of the present innovation.

Note that the processes of employing the surveyor application to gather information on the drivers 20, determining based thereon what drivers 20 to bypass, and construction and delivery of the corresponding customized VM 24 as at 403-411 may be rather substantial, and perhaps may consume several seconds or more. In such a case, it is to be appreciated that the user after having selected to log in as at 401 may not see the log-in screen as at 415 for quite some time. Accordingly, and in various embodiments of the present innovation, actions 403-411 of FIG. 4 may be performed prior to the user selecting to log in as at 401. Presumably, the user may be kept occupied up until then by any of a number of other tasks or even delaying tactics. If however actions 403-411 require an excessive amount of time, perhaps because of a lack of bandwidth in the network connection 12, a copy of the VM 24 may be stored on the computing device 10 for later re-use, perhaps in a hidden area of the storage memory 19 so as to evade possible alteration by a nefarious entity.

CONCLUSION

Thus far, the various embodiments of the present innovation have been set forth primarily in terms of a user logging in to a site 14 where especial damage may occur if the log-in data of the user is stolen by a nefarious entity. However, and as should be appreciated, the site 14 logged in to by the user may be most any site regardless of any relative amount of perceived damage that may occur if the log-in data of the user is stolen by a nefarious entity. Moreover, although the present innovation has been set forth primarily in terms of a customized VM 24, a standardized VM 24 may also be employed, in which case at least actions 403-407 of FIG. 4 and the surveyor application are not believed to be necessary. Further, although the present innovation is set forth primarily in terms of preventing a nefarious entity from stealing log-in data, such innovation may also be employed to prevent the nefarious entity from stealing other sensitive data entered by the user at the computing device for delivery to the site 14.

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided that prevent a nefarious entity from stealing sensitive data from a computing device 10 of a user, and particularly log-in data employed by the user to gain access to a site 14 on a network to which the computing device is communicatively coupled by a network connection 12. The operator of the site 14 downloads software such as the VM 24 to the computing device 10 when the user logs in to the site 14 to prevent the nefarious entity from stealing the log-in data of the user for the site 14.

It should be appreciated that changes could be made to the embodiments described above without departing from the innovative concepts thereof. For example, although the downloaded software from the site 14 is disclosed as being the VM 24, any other form of software that can be instantiated in the operating system 18 as resident in the operational memory 21 of the computing device 10 may alternately be employed. Likewise, although the downloading has thus far been set forth primarily in terms of downloading directly from a site 14 by way of a network connection 12, such downloading may also encompass receiving a portable media such as for example a portable USB jump drive or a diskette from an operator of the site 14 or an agent thereof with the drivers 22 thereon. If portable media, such media may act as the 'something the user has' element required by enhanced authentication. It should be understood, therefore, that this innovation is not limited to the particular embodiments disclosed, but it is intended to cover modifications within the spirit and scope of the present innovation as defined by the appended claims.

The invention claimed is:

1. A non-transitory computer-readable storage medium having instructions stored thereon that are executed by a processing resource to:

receive, from a user of a computing device, a selection to log in to a site;

download at least one replacing input/output driver from the site to the computing device, wherein each replacing driver is:

used for bypassing a corresponding driver operating on the computing device that is capable of copying log-in data including authentication credentials while the computing device logs in to the site;

determined to be more trustworthy than the corresponding bypassed driver to not copy the log-in data;

loaded into an operating system of the computing device so as to bypass the corresponding driver; and employed in the operating system instead of the corresponding bypassed driver; and receive log-in data from the computing device after each replacing driver has been loaded into the operating system, wherein each bypassed driver is unable to copy the received log-in data.

2. The medium of claim 1, wherein the instructions executed to download include instructions executed to receive a portable media from an operator of the site with the replacing driver thereon.

3. The medium of claim 1, wherein the replacing drivers include at least one of a keyboard driver, a video driver, and a mouse driver.

4. The medium of claim 1, wherein the replacing drivers are organized as a virtual machine (VM) to be instantiated in an operational memory of the computing device.

5. The medium of claim 1, wherein upon receiving the log-in data from the computing device, the operating system is returned to a state where each replacing driver is removed and each corresponding bypassed driver is again employed in the operating system instead of the corresponding removed replacing driver.

6. The medium of claim 1, wherein each driver in the operating system is located by other entities within the operating system by way of a reference thereto in a driver reference structure, and wherein loading each replacing driver so as to bypass the corresponding driver includes altering the reference to the bypassed driver as set forth in the driver reference structure to instead refer to the corresponding replacing driver, whereby any entity on the computing device that wishes to locate the bypassed driver instead locates the corresponding replacing driver, and the replacing driver is employed rather than the bypassed driver.

7. The medium of claim 1, wherein the downloaded replacing drivers are organized as a virtual machine (VM) to be instantiated in an operational memory of the computing device, wherein each driver in the operating system is located by other entities within the operating system by way of a reference thereto in a driver reference structure, and wherein the VM includes each replacing driver, processing code for, prior to the computing device logging in, instantiating each replacing driver in the operating system and altering the corresponding reference in the driver reference structure to point to the instantiated replacing driver rather than the corresponding bypassed driver, and processing code for, after the computing device logs in, removing each replacing driver from the operating system and altering the corresponding reference in the driver reference structure to point to the corresponding bypassed driver.

8. A computer-readable storage medium having instructions stored thereon that are executed by a processing resource to:

send, from a computing device, a selection to log in to a site;

receive, at the computing device as a download from the site, at least one replacing input/output driver, each replacing driver for bypassing a corresponding driver operating on the computing device that is capable of copying log-in data including authentication credentials as entered by a user during logging in to the site, each replacing driver being deemed by the site to be more trustworthy than the corresponding bypassed driver to not copy the log-in data;

load each replacing driver into an operating system of the computing device so as to bypass the corresponding driver and be employed in the operating system instead of the corresponding bypassed driver, wherein loading each replacing driver includes altering a reference to the bypassed driver in a driver reference structure to instead refer to the corresponding replacing driver; and send log-in data to the site after each replacing driver has been loaded into the operating system of the computing device, wherein each non-trusted and bypassed driver is unable to copy the entered log-in data.

9. The medium of claim 8, wherein the download includes a portable media received from an operator of the site with the replacing driver thereon.

10. The medium of claim 8, wherein the replacing drivers include at least one of a keyboard driver, a video driver, and a mouse driver.

11. The medium of claim 8, wherein the replacing drivers from the site are organized as a virtual machine (VM) to be instantiated in the operational memory of the computing device.

12. The medium of claim 8, wherein upon sending the log-in data, the operating system is returned to a state where each replacing driver is removed and each bypassed driver is again employed in the operating system rather than the corresponding removed replacing driver.

13. The medium of claim 8, wherein each driver in the operating system is located by other entities within the operating system by way of the reference thereto in the driver reference structure, whereby any entity on the computing device that wishes to locate the bypassed driver instead locates the corresponding replacing driver, and the replacing driver is employed rather than the bypassed driver.

14. The medium of claim 8, wherein the downloaded replacing drivers from the site are organized as a virtual machine (VM) to be instantiated in the operational memory of the computing device, wherein each driver in the operating system is located by other entities within the operating system by way of a reference thereto in a driver reference structure, and wherein the VM includes:

each replacing driver;

processing code for, prior to the computing device associated with the user logging in, instantiating each replacing driver in the operating system and altering the corresponding reference in the driver reference structure to point to the instantiated replacing driver rather than the corresponding bypassed driver; and processing code for, after the computing device associated with the user logs in, removing each replacing driver from the operating system and altering the corresponding reference in the driver reference structure to point to the corresponding bypassed driver.

15. A computer-readable storage medium having instructions stored thereon that are executed by a processing resource to:

receive, from a computing device, a selection to log in to the site;

send a surveyor application to the computing device, wherein the surveyor application at the computing device surveys the operating system of the computing device;

receive, from the surveyor application based on the survey of the operating system, data regarding each of several drivers in the operating system;

determine, from the data, whether each of the several drivers can be trusted;

construct a virtual machine (VM) customized to include a replacing driver corresponding to each non-trusted driver;

deliver the VM to the computing device, wherein the computing device instantiates the delivered VM in the operating system so as to bypass each non-trusted driver with a corresponding replacing driver to be employed in the operating system instead of the corresponding bypassed driver; and request log-in data including authentication credentials from the computing device after each replacing driver has been loaded into the operating system, wherein each of the non-trusted and bypassed drivers is unable to copy the entered log-in data.

16. The medium of claim 15, wherein the authentication credentials include a user name and a password.

17. The medium of claim 15, wherein the replacing drivers include at least one of a keyboard driver, a video driver, and a mouse driver.

18. The medium of claim 15, comprising instructions executed by the processing resource to receive the log-in data from the computing device, wherein upon receiving the log-in data, the operating system is returned to a state where each replacing driver is removed and each bypassed driver is again employed in the operating system rather than the corresponding removed replacing driver.

19. The medium of claim 15, wherein each driver in the operating system is located by other entities within the operating system by way of a reference thereto in a driver reference structure, and wherein loading each replacing driver so as to bypass the corresponding driver includes altering the reference to the bypassed driver as set forth in the driver reference structure to instead refer to the corresponding replacing driver, whereby any entity on the computing device that wishes to locate the bypassed driver instead locates the corresponding replacing driver, and the replacing driver is employed rather than the bypassed driver.

20. The medium of claim 15, wherein each driver in the operating system is located by other entities within the operating system by way of a reference thereto in a driver reference structure, and wherein the VM includes:

each replacing driver;

processing code for, prior to the computing device associated with the user logging in, instantiating each replacing driver in the operating system and altering the corresponding reference in the driver reference structure to point to the instantiated replacing driver rather than the corresponding bypassed driver, and processing code for, after the computing device associated with the user logs in, removing each replacing driver from the operating system and altering the corresponding reference in the driver reference structure to point to the corresponding bypassed driver.

* * * * *